United States Patent
Lemme

(10) Patent No.: US 7,316,458 B2
(45) Date of Patent: Jan. 8, 2008

(54) VENTILATING WHEEL FOR SNOWMOBILE SLIDE RAIL SUSPENSION SYSTEM

(75) Inventor: Jody L. Lemme, Arlington, SD (US)

(73) Assignee: Slydog, Inc., Arlington, SD (US)

( * ) Notice: Subject to any disclaimer, the term of this patent is extended or adjusted under 35 U.S.C. 154(b) by 287 days.

(21) Appl. No.: 11/132,729

(22) Filed: May 18, 2005

(65) Prior Publication Data

US 2006/0261671 A1 Nov. 23, 2006

(51) Int. Cl.
*B60S 1/62* (2006.01)
*B62M 27/02* (2006.01)

(52) U.S. Cl. ........................ 305/115; 305/111

(58) Field of Classification Search ........ 305/111–112, 305/115, 195, 199
See application file for complete search history.

(56) References Cited

U.S. PATENT DOCUMENTS

| | | | | |
|---|---|---|---|---|
| 1,513,459 A | * | 10/1924 | Jett | 305/114 |
| 1,613,925 A | * | 1/1927 | Boykin, Jr. | 242/611.1 |
| 1,673,541 A | * | 6/1928 | Wilson | 180/9.62 |
| 1,934,819 A | * | 11/1933 | Rorabeck | 474/152 |
| 2,854,294 A | * | 9/1958 | Bannister | 305/53 |
| 3,043,631 A | * | 7/1962 | Swoboda | 301/6.3 |
| 4,340,123 A | | 7/1982 | Fujikawa | |
| 4,387,780 A | | 6/1983 | Fujikawa | |
| 5,571,275 A | * | 11/1996 | Cyr | 305/127 |
| 6,000,766 A | * | 12/1999 | Takeuchi et al. | 305/160 |
| 6,094,845 A | * | 8/2000 | Lela | 37/219 |
| 6,976,742 B2 | * | 12/2005 | Girard et al. | 305/199 |

OTHER PUBLICATIONS

Extrovert Turbo II Sprockets, N/D. 1pg. Available: http//www.kineticinc.net/yamaha_products.ydev.

* cited by examiner

*Primary Examiner*—Jason R. Bellinger
(74) *Attorney, Agent, or Firm*—Black Lowe & Graham, PLLC

(57) ABSTRACT

A ventilating wheel provides a plurality of angled vanes extending from a hub. The ventilating wheel secures to the slide rail of a snowmobile suspension system. An endless track extends over the underside of the slide rail. A Hyfax may secure to the slide rail interposed between the track and slide rail to reduce friction therebetween. The ventilating wheel is in rolling contact with the track and is rotated thereby to draw air and snow over the slide rail. In some embodiments, air and snow flow over the radiator is induced. The ventilating wheel may serve as an idler wheel defining the shape of the track. In other embodiments, the ventilating wheel mounts to a straight portion of the slide rail and serves to reduce pressure on the Hyfax. In still other embodiments, the ventilating wheel serves only to increase air and snow circulation.

20 Claims, 5 Drawing Sheets ly high molecular weight the Hyfax, provi-
VENTILATING WHEEL FOR SNOWMOBILE SLIDE RAIL SUSPENSION SYSTEM

FIELD OF THE INVENTION

This invention relates generally to snowmobile endless track propulsion systems, and, more specifically, to slide rail suspensions for such systems.

BACKGROUND OF THE INVENTION

In snowmobile design, lightness of weight is essential. In order to reduce the weight of snowmobiles, manufacturers are constantly attempting to simplify the operations of snowmobiles and shrink the size of parts. In modern snowmobiles, the operation of the endless track system, which interfaces with the snow, has been greatly simplified through the use of slide rails to support the track. A typical modern endless track system includes a wide loop of track, which may have ridges formed on the outer surface thereof to increase traction with the snow. The track extends around a drive wheel, driven by an engine. The track likewise surrounds two parallel slide rails, which may each have one or more idler wheels at one or both of its ends. A suspension may couple the slide rails to the body of the snowmobile to absorb shocks from uneven terrain.

The slide rails provide a simple lightweight structure for maintaining a large portion of the track parallel to the ground in a position to engage the snow. During operation, the track slides over the rails, creating a great deal of heat and friction losses. To reduce friction, the lower surface of the slide rails bear strips of material, referred to as Hyfax, formed of a low-friction material. In typical applications the hyfax is formed of an ultra-high molecular weight (UHMW) polymer. Series of metal clips secured along the interior surface of the track engage the Hyfax to provide a low friction interface.

Although the Hyfax and track clips are designed to reduce friction as much as possible, friction is nonetheless present along with the heat it generates. In some snow conditions, snow from the environment will melt on the Hyfax, providing both cooling and lubrication. In very cold conditions, the snow may contact the Hyfax, but not melt to provide a lubricant. In addition, in very fine, dry snow and on ice, such as frozen lakes and well traveled trails, an insufficient volume of snow will contact the Hyfax. Heat will therefore build up in the Hyfax. When the UHMW polymer constituting the Hyfax reaches 180° to 212° F., it begins to break down. It may become distorted and soften, causing the track clips to start sticking to the sliders, increasing both friction and wear. At temperatures at or above 267° F., the Hyfax will melt.

The weight of snowmobiles is also reduced by using a small radiator that takes advantage of surrounding snow for cooling, rather than relying solely on air as in most other types of vehicles. A typical radiator mounts above the track, beneath the seat of the snowmobile. In some conditions, the track will throw snow onto the radiator. However, as with the Hyfax, on ice and in fine, dry snow, the volume of snow contacting the radiator may be insufficient to provide adequate cooling.

In view of the foregoing, it would be an advancement in the art to provide a more effective system for cooling the Hyfax and radiator of a snowmobile. Such a system should improve cooling regardless of snow conditions and be both inexpensive and lightweight. It would be a further advantage to provide an improved cooling system that could be incorporated into an existing endless track drive system without extensive modification thereof.

SUMMARY OF THE INVENTION

The present invention provides one or more ventilating wheels secured to a snowmobile each with its rim in rolling engagement with the endless track to be rotated thereby. In some embodiments, the ventilating wheel secures to a linear bearing, such as a slide rail, that supports the lower portion of an endless track. Extending radially from the hub of the ventilating wheel to the rim are vanes oriented to propel air and snow over the Hyfax of the snowmobile. In some embodiments flows of air and snow created by the vanes are also directed toward the radiator of the snowmobile. The vanes may be embodied as planar members that are angled relative to the plane of rotation of the wheel. The vanes are typically the sole means securing the rim to the hub.

The ventilating wheel may be dedicated to supplying air and snow flow or may also function as a bogey wheel tangentially engaging the track for reducing pressure on the Hyfax. In other embodiments, the ventilating wheel functions as an idler wheel engaging a substantial angular portion of the track. Multiple ventilating wheels may secure to a single slide rail for increased airflow. For example, idler wheels and bogey wheels may both be present in a slide rail suspension system and all be embodied as ventilating wheels.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
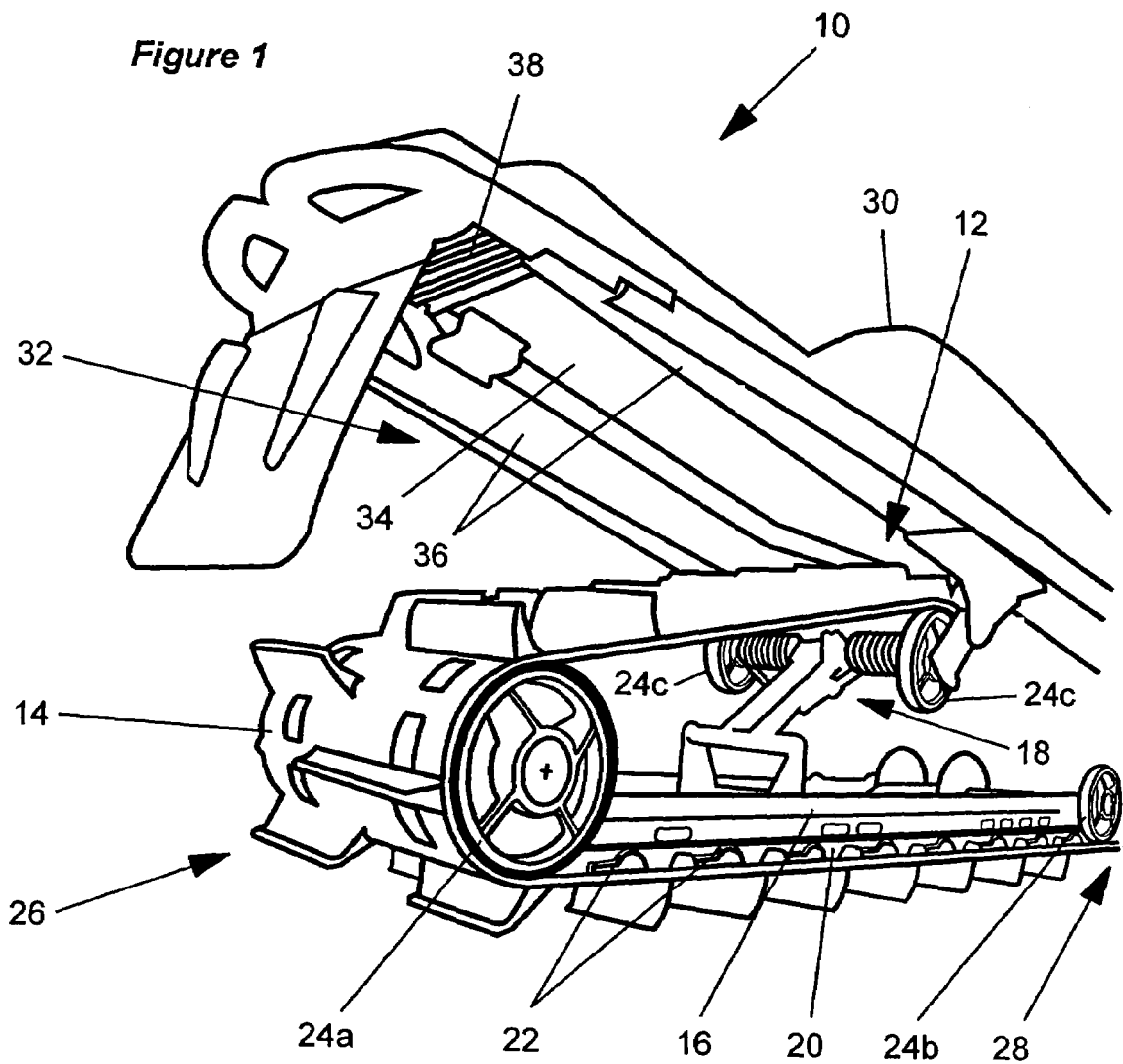
FIG. 1 is rear quarter perspective view of a snowmobile.

Referring to FIG. 1, a snowmobile 10 typically has an endless track propulsion system 12 providing both traction and a surface for preventing the snowmobile from sinking into the snow. This surface is provided by a wide flexible endless track 14 (hereinafter track 14). In typical applications, a broad flat portion of the track 14 must engage the snow in order to provide enough traction to propel the snowmobile. Accordingly, linear bearings, such as slide rails 16 are positioned within the area encircled by the track 14 and shape the track 14 at the point of engagement with the snow. Typical snowmobile systems include at least two slide rails 16 positioned parallel to one another near the edges of the track 14. The slide rails 16 are positioned near the lower extent of the path of the track 14 and are typically oriented parallel to the ground. A suspension system 18 maintains the substantially parallel orientation of the slide rails 16 and provides a shock absorbing coupling between the slide rails 16 and the body of the snowmobile 10.

The interface between the slide rails 16 and the track 14 is simply sliding contact. Accordingly, friction between the slide rails 16 and track 14 is present, resulting in wear, heat build up, and friction losses. A hyfax 20 embodied as a strip of low coefficient of friction material secures to the lower surface of each slide rail 16 and serves to reduce friction between the track 14 and the slide rails 16. The hyfax 20 is typically formed of an ultra-high molecular weight (UHMW) polymer.

In a typical system, the portion of the track 14 engaging the hyfax 20 has a series of metal clips 22 secured thereto. The clips 22 serve to reduce friction and wear and distribute the force exerted on the track 14 by a toothed drive wheel (not shown) that engages the track and is driven by the engine of the snowmobile.

An idler wheel 24a may be positioned at a distal end 26 of the slide rails 16. The idler wheel 24a may function to reduce friction at the point where the track 14 angles sharply upward prior to the upper portion of the path of the track 14. In some embodiments, a second idler wheel 24b may be positioned near a proximal end 28 of the slide rails 16 to reduce friction as the track 14 changes direction at that point. In some embodiments, the slide rails 16 are curved near the proximal end 28 to accomplish the change in direction and the idler wheel 24b is eliminated. An additional idler wheel 24c may support the upper extent of the track 14. The idler wheel 24c typically secures to the frame of the snowmobile 10.

A rider may sit on a seat 30 positioned above the track 14. In typical snowmobiles the seat 30 rests on a tunnel 32 having a top 34 and sides 36 for encasing a substantial portion of the upper portion of the track 14. The tunnel 32 typically provides structural support for the seat 30. The idler wheel 24c may also secure to the tunnel 32. A radiator 38 secures within the tunnel, typically near the rearward end of the tunnel 32, such that snow and ice thrown out by the track 14 may be used to cool the engine.

Figure 2:
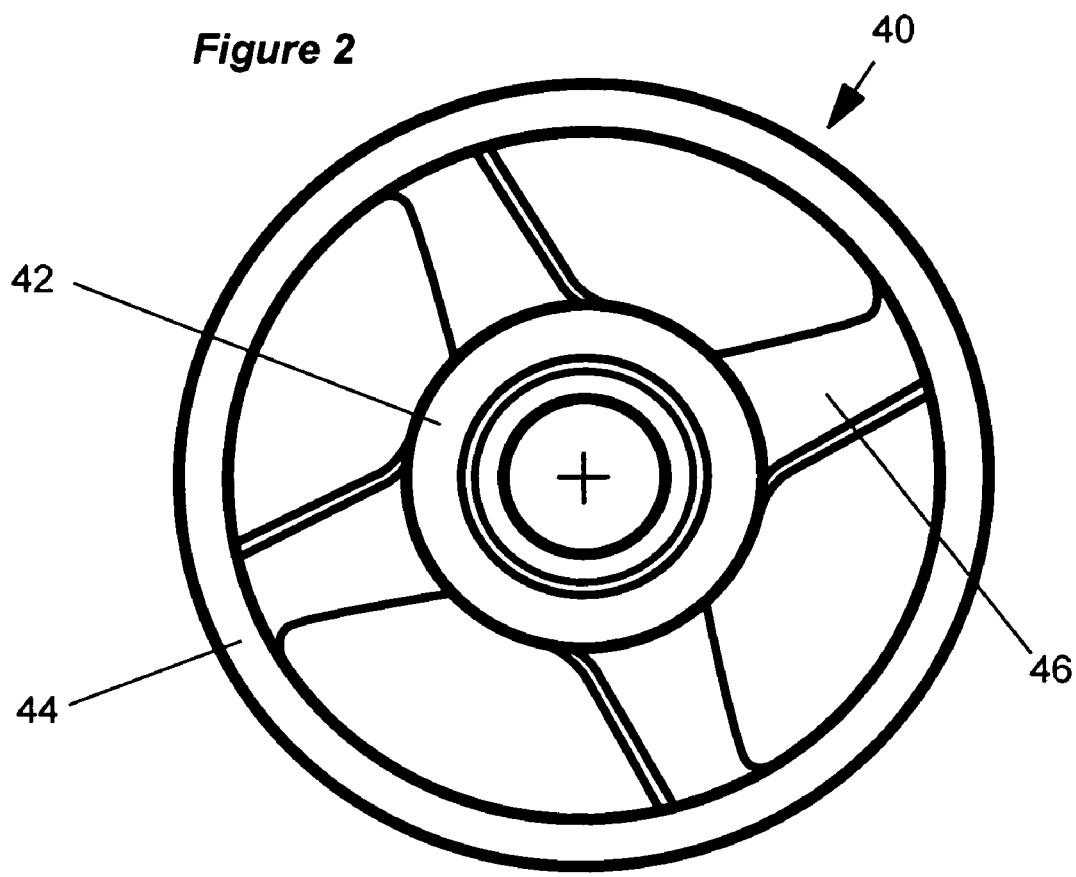
FIG. 2 is a side elevational view of a ventilating wheel, in accordance with the present invention.
Figure 3:
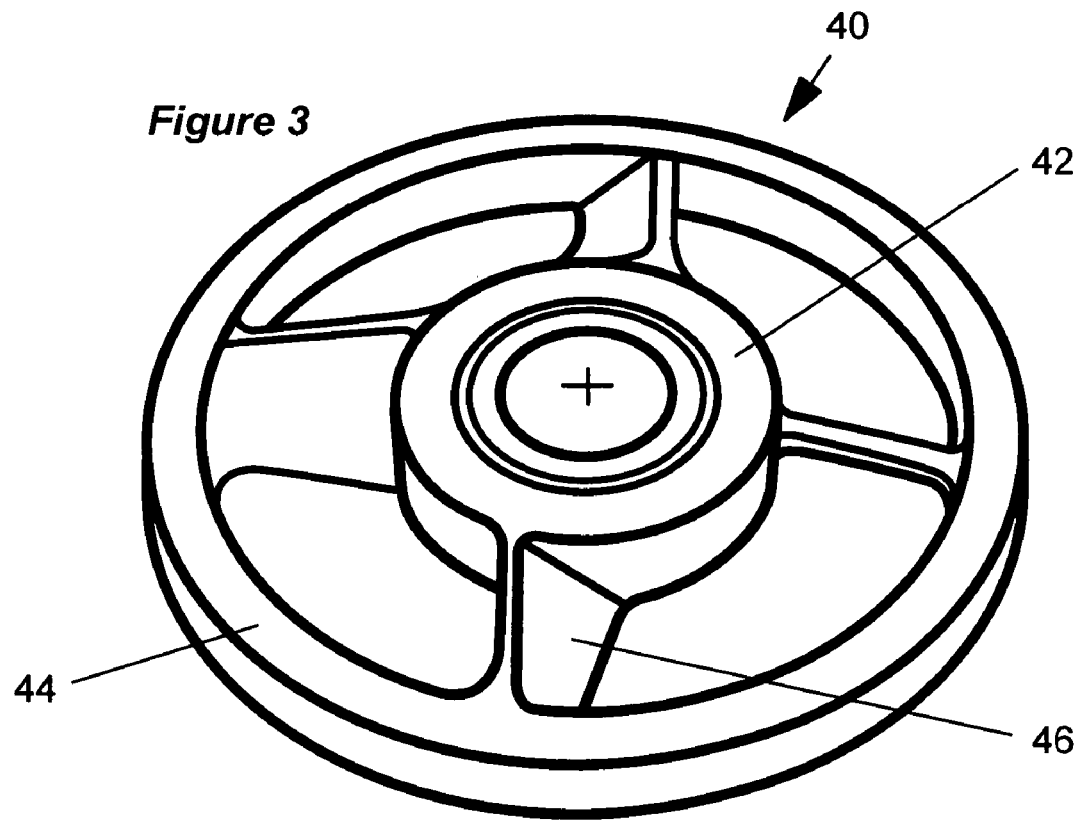
FIG. 3 is an isometric view of a ventilating wheel, in accordance with the present invention.

Referring to FIGS. 2 and 3, one or more of the idler wheels 24a-24c may be configured to facilitate cooling and lubricating of the Hyfax 20, the radiator 38, or both. During operation, the Hyfax 20 typically increases in temperature as a result of the friction between itself and the track 14. In ideal snow conditions, the snow from the environment melts on the Hyfax, providing water that serves as a lubricant. However, in very cold conditions, the snow may contact the Hyfax 20, but not melt to provide a lubricant, resulting in increased wear. In addition, in very fine, dry snow and on ice, such as frozen lakes and well traveled trails, an insufficient volume of snow will contact the Hyfax 20. Heat will therefore build up in the Hyfax 20. When the UHMW polymer constituting the Hyfax 20 reaches 180° to 212° F., it begins to break down. It may become distorted and soften, causing the clips 22 to start sticking to the Hyfax 20, increasing both friction and wear. At temperatures at or above 267° F., the Hyfax 20 will melt. As with the Hyfax 20, the radiator 38 may not be sufficiently cooled when the snowmobile 10 is driven on ice and in fine, dry snow. In such conditions, the volume of air and snow passing over the radiator 38 may be insufficient to provide adequate cooling.

One or more of the idler wheels 24a-24c may therefore be embodied as a ventilating wheel 40 of FIGS. 2 and 3 to improve cooling of the Hyfax 20, the radiator 38, or both. The wheel 40 includes a hub 42 secured to the slide rail 16 or tunnel 32 and a rim 44 concentric with the hub 42. The hub 42 secures to the slide rail 16 or tunnel 32 by means of a bearing such that substantially friction free rotation relative to the slide rail 16 or tunnel 32 is permitted. Vanes 46 extend radially from the hub 42 and secure to the rim 44. The vanes 46 are typically oriented to draw air and snow toward the slide rail 16 and Hyfax 20 or to otherwise draw air and snow into the space encircled by the track 14. The number and shape of the vanes 46 may be chosen to increase air and snow flow according to known principles of aerodynamics. In the illustrated embodiments four vanes are used. The vanes 46 of FIGS. 2 and 3 have a substantially planar shape and are angled relative to the plane of rotation of the wheel 40. The vanes 46 are typically of sufficient strength to transfer the force exerted on the rim 44 by the track 14 to the hub 42. The hub 42, rim 44, and vanes 46 may be made of steel or high-strength plastic.

Figure 4:
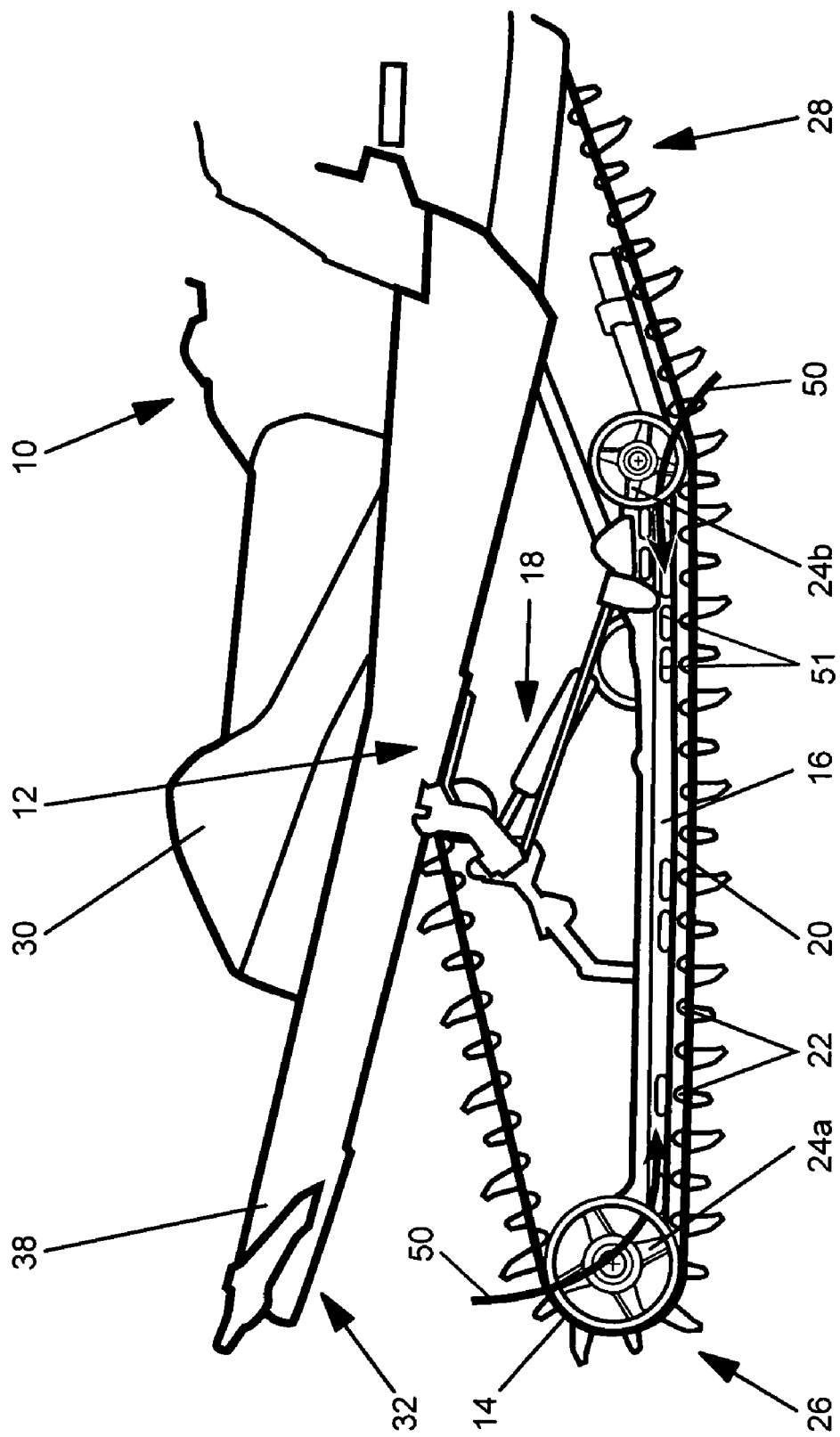
FIG. 4 is a side view of a simplified representation of an endless track propulsion system having ventilating wheels, in accordance with the present invention.

Referring to FIG. 4, the position of the idler wheels 24a, 24b near the surface of the snow, enables the vanes 46 to induce a flow 50 of air, snow, or both, over the slide rail 16 and Hyfax 20. In some embodiments, a slide rail 16 may have apertures 51 formed therein to decrease the weight of the slide rail 16. In such embodiments, the air and snow flow 50 may be directed through the aperture 51, such that the Hyfax 20 of the slide rail 16 to which it is not secured is also cooled thereby.

Figure 5:
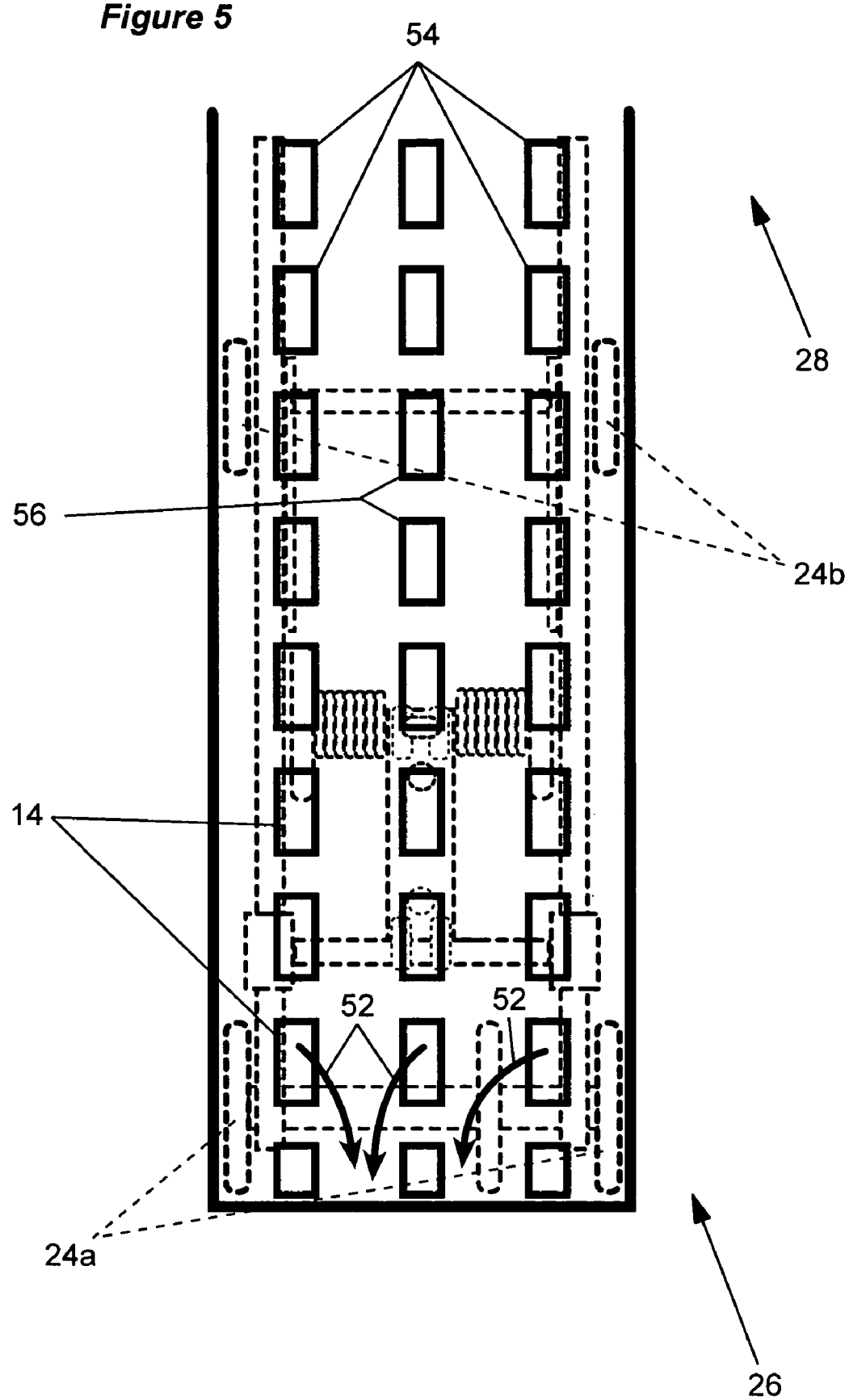
FIG. 5 is a top view of a simplified representation of an endless track propulsion system, in accordance with the present invention.

FIG. 5 is a top view of a simplified endless track 14 having traction enhancing ridges omitted. The track 14 typically includes apertures 54 to receive teeth of a drive wheel driven by the engine. Additional apertures 56 serving ventilating or other purposes may also be formed in the track 14. The idler wheels 24a-24c may induce an air and snow flow 52 into the volume encircled by the track 14 and through the apertures 54 and 56 to provide increased cooling at the radiator 38. The radiator 38 is typically positioned to the rear of the snowmobile 10 above the track 14 but may be positioned elsewhere to take advantage of air and snow flow 52.

Figure 6:
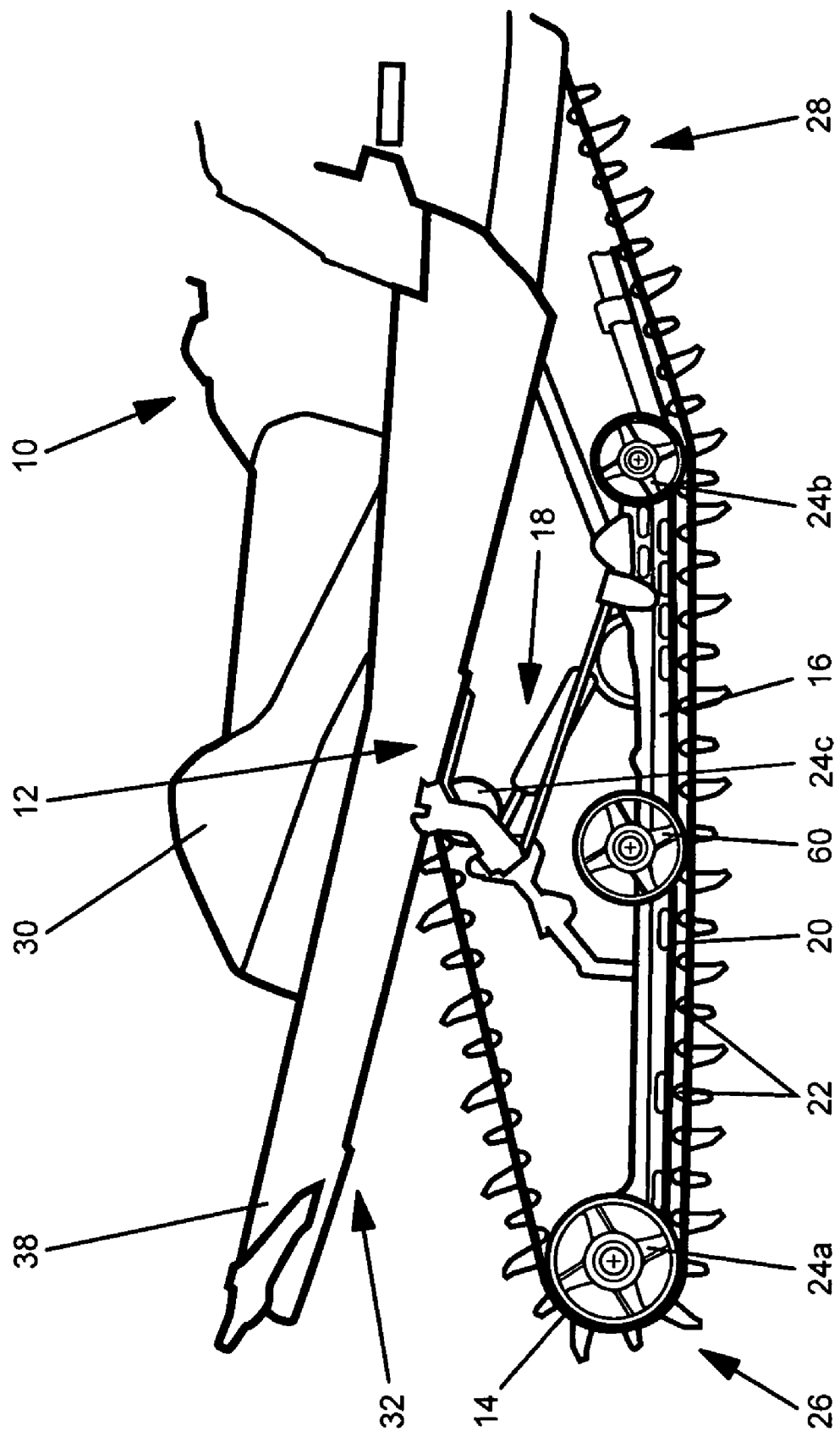
FIG. 6 is a side view of a simplified representation of an endless track propulsion system having a ventilating bogey wheel, in accordance with the present invention.

Referring to FIG. 6, in some embodiments a ventilating wheel 40 may serve as an additional bogey wheel 60 secured to the slide rail 16 at a high wear location to reduce pressure thereon, while also increasing air and snow flow. Alternatively, in some embodiments, the wheel 40 may be used primarily for ventilating purposes, rather than for support of the track 14. For example, the bogey wheel 60 may secure to the slide rail 16 such that the track 14 exerts only sufficient force thereon to develop friction forces sufficient to force rotation of the bogey wheel 60. Accordingly, the hub 42, rim 44, and vanes 46 may be made lighter according to the reduction in force exerted thereon.

In other embodiments, a ventilating wheel 40 may secure to the frame of the snowmobile, such as to the tunnel 32 such that it is in rolling contact with the outer surface of the track 14. The radiator 38 may be positioned proximate the ventilating wheel 40, or wheels 40, to enhance cooling.

While the preferred embodiments of the invention have been illustrated and described, as noted above, many changes can be made without departing from the spirit and scope of the invention. For example, the shape and configuration of the vanes 46 may be varied according to principles of aerodynamics. The position and number of ventilating wheels on the slide rails 16 may likewise vary from the illustrated embodiments. Accordingly, the scope of the invention is not limited by the disclosure of the preferred embodiment. Instead, the invention should be determined entirely by reference to the claims the follow.

The embodiments of the invention in which an exclusive property or privilege is claimed are defined as follows:

1. A cooling system for a snowmobile suspension system comprising:
   an endless track encircling a space;
   a linear bearing for supporting the endless track; and
   a ventilating wheel coupled to the linear bearing and having a portion thereof in rolling engagement with the endless track, the ventilating wheel having a plurality of vanes, each vane having an aerodynamically contoured surface oriented at to an angle with respect to a rotational plane of the ventilating wheel, the angle being greater than parallel and less than perpendicular with respect to the rotational plane, the plurality of vanes operating to move air through at least a portion of the space encircled by the endless track.

2. The cooling system of claim 1, further comprising a low-friction material interposed between the linear bearing and the endless track and arranged to receive air from the space encircled by the endless track.

3. The cooling system of claim 1, wherein the ventilating wheel further comprises:
   a hub rotatably mounted to the linear bearing; and
   a rim circumscribing the plurality of vanes and secured to the distal ends thereof, the rim in rolling engagement with the endless track.

4. The cooling system of claim 3, wherein the endless track engages a substantial angular portion of the rim.

5. The cooling system of claim 3, wherein the track tangentially contacts the ventilating wheel.

6. The cooling system of claim 1, comprising multiple ventilating wheels each secured to the linear bearing.

7. The cooling system of claim 1, wherein the linear bearing includes two slide rails arranged substantially adjacent and substantially parallel to one another.

8. A cooling system for a snowmobile comprising:
   an endless track;
   a linear bearing for supporting the endless track; and
   a ventilating wheel coupled to the linear bearing comprising
      a hub rotatably mounted to the linear bearing,
      a plurality of vanes extending radially from the hub, at least one of the vanes having an aerodynamically contoured surface that is acutely angled relative to the plane of rotation of the ventilating wheel to draw air past the at least one of the vanes and over a desired region of the linear bearing, the acutely angled aerodynamically contoured surface having an angle being greater than parallel and less than perpendicular with respect to the plane of rotation, and
      a rim in rolling engagement with the endless track, the rim circumscribing the vanes and secured to the distal ends thereof, the vanes being the sole means securing the rim to the hub.

9. The cooling system of claim 8, wherein the vanes comprise substantially planar members angled relative to the plane of rotation of the ventilating wheel, to draw air between the vanes during wheel rotation.

10. The cooling system of claim 8, wherein the endless track engages a substantial angular portion of the rim.

11. The cooling system of claim 8, wherein the track tangentially contacts the rim.

12. The cooling system of claim 8, further comprising a low-friction material interposed between the linear bearing and the endless track, the plurality of vanes of the ventilating wheel drawing air and snow toward an interface located between the endless track and the low-friction material.

13. The cooling system of claim 8, wherein the linear bearing comprises two parallel slide rails.

14. The cooling system of claim 13, wherein multiple ventilating wheels engage each slide rail.

15. A cooling system for a snowmobile comprising:
   an endless track slidably secured to the snowmobile;
   a ventilating wheel mounted to the snowmobile, the ventilating wheel comprising
      a hub rotatably mounted to the snowmobile,
      a plurality of vanes extending generally radially from the hub, each vane having an aerodynamically contoured surface oriented at to an angle with respect to a rotational plane of the ventilating wheel, the angle being greater than parallel and less than perpendicular with respect to the rotational plane to permit air flow over the aerodynamically contoured surface such that the air is moved past the aerodynamically contoured surface and over a desired region of the snowmobile as the wheel spins, and
      a rim circumscribing the vanes and secured to the distal ends thereof, the rim in rolling engagement with the endless track.

16. The cooling system of claim 15, wherein the vanes are the sole means securing the rim to the hub.

17. The cooling system of claim 16, wherein the snowmobile comprises a linear bearing mounted thereto in sliding contact with the endless track, the ventilating wheel being mounted to the linear bearing having the rim in rolling engagement with an inner surface of the endless track.

18. A method for cooling a snowmobile comprising:
   providing a ventilating wheel having angled, flow-inducing vanes, said wheel being secured to a linear bearing of a snowmobile suspension, the vanes angled relative to a plane of rotation of the ventilating wheel such that an aerodynamically contoured surface of each vane is oriented with respect to the plane of rotation such that a substantial portion of the aerodynamically contoured surface has an angle greater than parallel and less than perpendicular with respect to the plane of rotation; and
   rotating the ventilating wheel to move air between the vanes of the ventilating wheel and to increase an amount of airflow in a desired region of the linear bearing.

19. The method of claim 18, wherein rotating the ventilating wheel includes driving the track of the snowmobile.

20. The method of claim 18, wherein the ventilating wheel comprises:
   a hub rotatably mounted to the linear bearing;
   wherein a plurality of the vanes extends radially from the hub; and
   a rim in rolling engagement with the endless track, the rim circumscribing the vanes and secured to the distal ends thereof.

* * * * *